United States Patent
Bluhm et al.

(10) Patent No.: US 7,480,644 B2
(45) Date of Patent: Jan. 20, 2009

(54) SYSTEMS METHODS, AND SOFTWARE FOR DISTRIBUTED LOADING OF DATABASES

(75) Inventors: Mark A. Bluhm, Cottage Grove, MN (US); Jon Verreaux, Cottage Grove, MN (US)

(73) Assignee: Thomas Reuters Global Resources, Zug (CH)

( * ) Notice: Subject to any disclaimer, the term of this patent is extended or adjusted under 35 U.S.C. 154(b) by 196 days.

(21) Appl. No.: 11/328,499

(22) Filed: Jan. 9, 2006

(65) Prior Publication Data

US 2006/0174101 A1 Aug. 3, 2006

Related U.S. Application Data

(60) Provisional application No. 60/642,351, filed on Jan. 7, 2005.

(51) Int. Cl.
*G06F 7/00* (2006.01)
(52) U.S. Cl. ............................................. 707/2; 707/10
(58) Field of Classification Search ................. 707/1–2, 707/8–10
See application file for complete search history.

(56) References Cited

U.S. PATENT DOCUMENTS

| | | | | |
|---|---|---|---|---|
| 5,530,855 | A * | 6/1996 | Satoh et al. | 707/201 |
| 5,838,965 | A * | 11/1998 | Kavanagh et al. | 707/103 R |
| 6,247,141 | B1 | 6/2001 | Holmberg | |
| 6,519,763 | B1 * | 2/2003 | Kaufer et al. | 717/101 |
| 6,571,285 | B1 * | 5/2003 | Groath et al. | 709/223 |
| 6,574,617 | B1 * | 6/2003 | Immerman et al. | 707/1 |
| 6,785,696 | B2 * | 8/2004 | Mosher et al. | 707/204 |
| 6,985,901 | B1 * | 1/2006 | Sachse et al. | 707/10 |
| 7,003,531 | B2 * | 2/2006 | Holenstein et al. | 707/201 |
| 7,100,195 | B1 * | 8/2006 | Underwood | 726/2 |
| 2002/0112224 | A1 | 8/2002 | Cox | |
| 2003/0037284 | A1 | 2/2003 | Srinivasan et al. | |
| 2003/0074606 | A1 * | 4/2003 | Boker | 714/42 |
| 2003/0135735 | A1 | 7/2003 | Marejka et al. | |

(Continued)

FOREIGN PATENT DOCUMENTS

WO   WO-2006/078502 A2   7/2006

(Continued)

OTHER PUBLICATIONS

"International Search Report for corresponding PCT Application No. PCT/US2006/000747", (Aug. 2, 2006), 4 pgs.

(Continued)

*Primary Examiner*—Hung Q Pham
*Assistant Examiner*—Linh Black
(74) *Attorney, Agent, or Firm*—Schwegman, Lundberg & Woessner, P.A.

(57) ABSTRACT

The present inventors have devised one or more systems, methods, and software for distributed loading of information retrieval systems. One exemplary system includes two or more (at least two) load monitor servers that not only monitor and ensure completion of load tasks by individual load servers in a set of two or more load servers, but also provide for one load monitor to monitor performance of the another. Moreover, the exemplary system provides a service-level-agreement (SLA) data structure for each load server. The SLA data structure governs what types and priority levels of loading tasks will be performed for predetermined time periods.

15 Claims, 2 Drawing Sheets

U.S. PATENT DOCUMENTS

| | | | |
|---|---|---|---|
| 2003/0135823 A1* | 7/2003 | Marejka et al. | 715/511 |
| 2004/0039550 A1* | 2/2004 | Myers | 702/186 |
| 2004/0128165 A1* | 7/2004 | Block et al. | 705/2 |
| 2004/0215670 A1* | 10/2004 | Holenstein et al. | 707/201 |
| 2005/0049996 A1* | 3/2005 | Srinivasan et al. | 707/1 |
| 2006/0010170 A1* | 1/2006 | Lashley et al. | 707/200 |

FOREIGN PATENT DOCUMENTS

| | | |
|---|---|---|
| WO | WO-2006078502 A3 | 7/2006 |

OTHER PUBLICATIONS

"International Application Serial No. PCT/US2006/000747, International Perliminary Report on Patentability mailed Jul. 19, 2007", 12 pgs.

"International Application Serial No. PCT/US2006/000747, International Search Report mailed Aug. 14, 2006", 6 pgs.

"International Application Serial No. PCT/US2006/000747, Written Opinion mailed Aug. 14, 2006", 10 pgs.

* cited by examiner

SYSTEMS METHODS, AND SOFTWARE FOR DISTRIBUTED LOADING OF DATABASES

RELATED APPLICATION

The present application claims priority to U.S. Provisional Application 60/642,351 which was filed on Jan. 7, 2005, and which is incorporated herein by reference.

TECHNICAL FIELD

Various embodiments of the present invention concern information retrieval, particularly systems, methods, and software for loading data into databases.

BACKGROUND

One problem recognized by the present inventors concerns the loading of new documents onto an online information retrieval system. Loading generally entails indexing the documents to facilitate searching using Boolean or natural language search algorithms and then adding the documents and the corresponding index data to an existing database and index file.

Conventionally, a large and costly server, such as a Sun Microsystems 6500 or 6800, was purchased and programmed to specifically serve the loading needs of a given set of databases or collections. Unfortunately, this reliance of a single server makes the system vulnerable to server malfunctions or crashes during the loading process. In many instances, a crash necessitates the reloading of the entire quantity of data, and ultimately delays addition and thus user or subscriber access to new documents. Such delays are particularly significant for time-sensitive data, such as U.S. Supreme Court decisions or breaking news.

Accordingly, the inventors have recognized a need for better ways of loading databases in online information retrieval systems.

SUMMARY

To address this and/or other needs, the present inventors have devised one or more systems, methods, and software for distributing loading of information retrieval systems. In one exemplary system, distributed load domains logically organize and coordinate operation of multiple load servers to meet load capacity needs of a set of one or more databases. The exemplary systems includes two or more (at least two) load monitor servers that not only monitor and ensure completion of load tasks by individual load servers, but also provide for one load monitor to monitor performance of the another. Moreover, the exemplary system provides a service-level-agreement (SLA) data structure for each load server. The SLA data structure governs what types and priority levels of loading tasks will be performed for predetermined time periods.

DETAILED DESCRIPTION OF EXEMPLARY EMBODIMENT(S)

This description, which incorporates the Figures and the claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information Retrieval System

Figure 1:
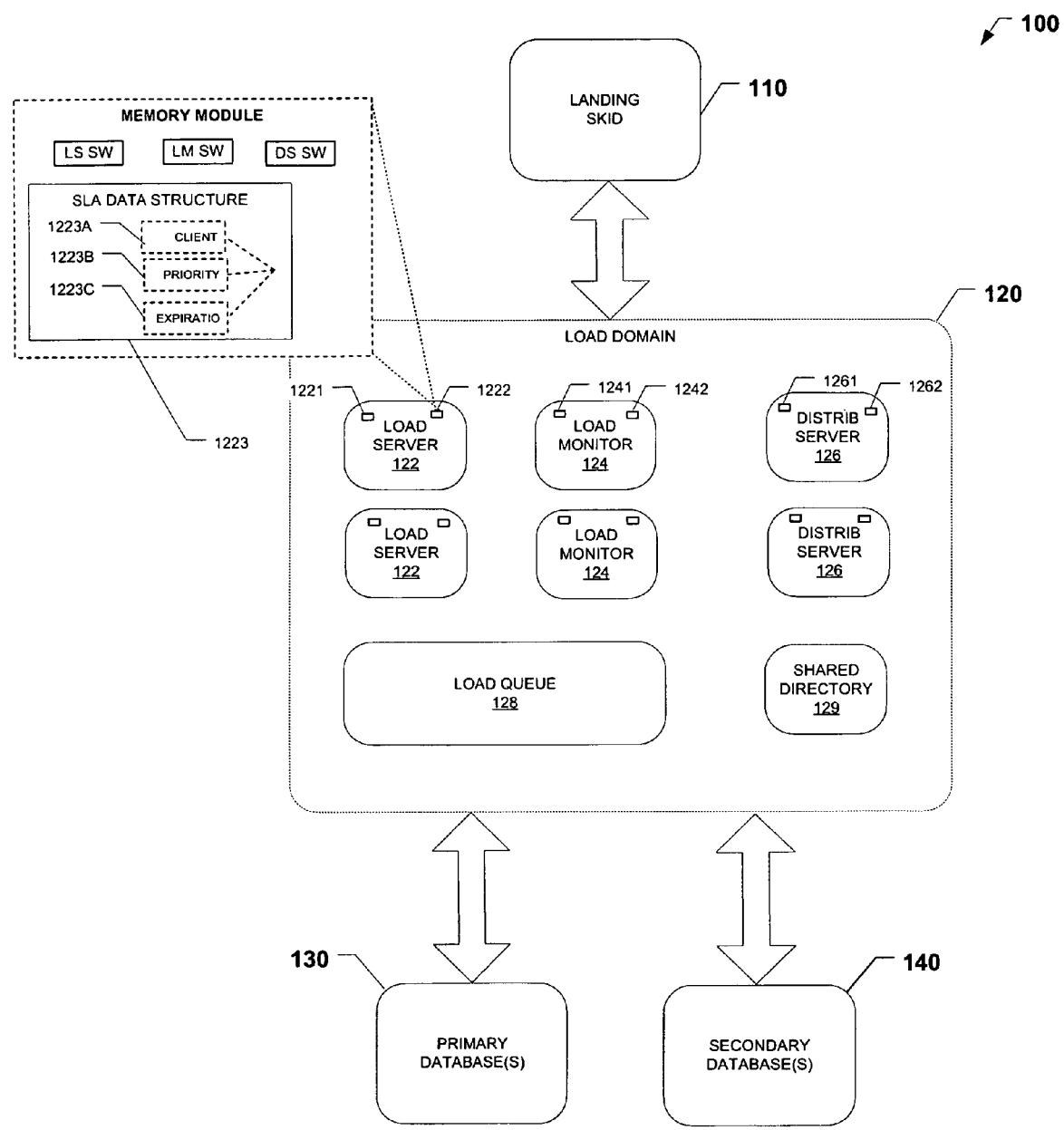
FIG. 1 is a block diagram of an exemplary information retrieval system 100 which corresponds to one or more embodiments of the invention.

FIG. 1 shows an exemplary information retrieval system 100 incorporating teachings of the present invention. System 100 includes a landing skid database 110, a load domain 120, a primary database 130, and a secondary database 140.

Landing skid database 110 receives and stores new or updated files for addition to system 100, or primary database 130. In the exemplary embodiment, landing skid database 110 takes the form of a network accessible storage (NAS) device and receives and stores files in an extensible-markup-language (XML) format. The files include documents with a command-script type header information that includes a globally unique document identifier and a database command, such as add or delete.

Load domain 120 includes a set of one or more load servers 122, a set of two or more load monitor servers 124, a set of one or more distribution servers 126, a load queue 128, and a shared directory 129. In the exemplary embodiment each of the servers is logically associated with a load domain, which is itself associated with one or more document collections or databases, such as primary database 130. (In the exemplary embodiment, a load domain includes one or more load boxes that have shared access to a landing skid and load index files. Any load box in a load domain can service any collection that is part of that load domain.)

Servers 122, 124, and 126 include respective processing modules 1221, 1241, and 1261 and respective memory modules 1222, 1242, and 1262. Each of the processing modules includes one or more processors or processing circuits, for example dual processors. And, each of the memory modules includes machine-executable instructions (software (SW)) for causing the respective processing modules to perform acts as described below in the exemplary method section. Moreover, in the exemplary embodiment, each of the servers includes the instructions of each of the other servers, enabling, for example, a load server (LS) to be readily operated as a load monitor server (LM) or a distribution server (DS). (In some embodiments, each of the servers is implemented as a server blade, that is, a single circuit board populated with components such as processors, memory, and network connections that are usually found on multiple boards. Server blades are more cost-efficient, smaller and consume less power than traditional box-based servers used in other embodiments.)

Additionally, each of load servers 122 includes or is associated with a service-level-agreement (SLA) data structure which governs operational context of the load server. SLA data structure 1223, which is representative, includes a client field 1223A for indicating what databases or database collections the load requests or other work to be accepted by the associated load server must pertain to; a priority field 1223B for indicating a minimum priority of the load requests or other work to accepted by the associated load server; and a temporal indicator 1223C for indicating related temporal aspects of the service level agreement, such as the effective period or duration of the agreement. Some embodiments provide for two SLA data structure, a permanent one and a temporary one, with the temporary one having a life that expires after a predetermined time period and allows the prior SLA data structure to automatically reinstate. Thus, for example, a user, using a GUI (graphical user interface) not shown may establish one or more of the load servers as dedicated to handling load requests for a specific database, such as U.S. Supreme Court, or to handling request of a specific minimum priority. The SLA would be in effect for several, hours, days, weeks, or even longer before automatically expiring and allowing reinstatement of the prior SLA.

In some embodiments, each load monitor server 124 operates using the following parameters:

Distributed_Load_Shared_Directory identifies the path to shared directory where heartbeat-type information is written by the load monitors;

Distributed_Load_Directory_Monitor_Interval, for example 300000 milliseconds, denotes the amount of time in milliseconds before the non-active or secondary load monitor rechecks the landing skid for new requests;

Distributed_Load_Working_File_Monitor_Interval, for example 300000 milliseconds, denotes the amount of time before the non-active Load Monitor rechecks the working file modification time;

Distributed_Load_Completed_Requests_Monitor_Interval, for example 300000 milliseconds, denotes the amount of time in ms before the non-active Load Monitor rechecks load queue 128 for completed requests.

Load queue 128 provides a queuing function for use in managing work flow of the load domain. In the exemplary embodiment, the queue is accessible by servers 122, 124, and 126.

Shared directory 129 functions as a communications intermediary, which is accessible to other components or servers in the load domain, such as all the other load monitors in load domain 120. In the exemplary embodiment, the shared directory is part of a network accessible storage (NAS) device and is used to exchange heartbeat information from one load monitor to another as described below. In some embodiments, the shared directory can be a part of the landing skid database. (In some embodiments with multiple load domains, each load domain includes its own set of load monitors that includes its own respective shared directory.)

Primary database 130 and secondary database 140 are redundant or mirror-image databases. In some embodiments they are maintained at separate sites to reduce risk of catastrophic failure. Although not shown in the Figure, users or subscriber access primary database 130 using a client device, such as personal computer over a local or wide-area network.

Exemplary Method of Operating an Information Retrieval System

Figure 2:
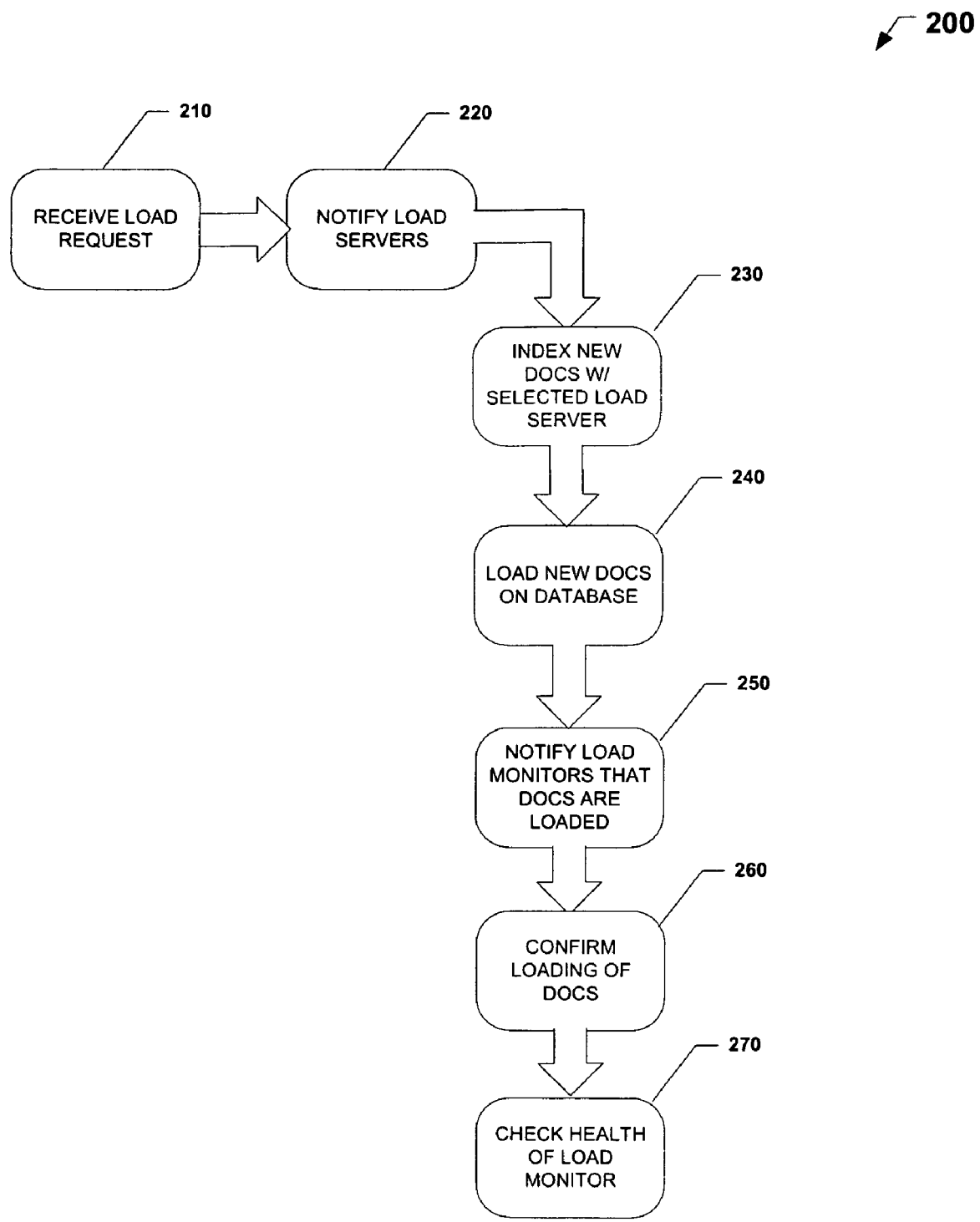
FIG. 2 is a block diagram of an exemplary method which corresponds to one or more embodiments of the invention.

FIG. 2 shows a flow chart 200 of an exemplary method of operating an information retrieval system, such as system 100 in FIG. 1. Flow chart 200 includes blocks 210-270, which are arranged and described serially. However, other embodiments execute two or more blocks in parallel using multiple processors or processor-like devices or a single processor organized as two or more virtual machines or sub processors. Other embodiments also alter the process sequence or provide different functional partitions or blocks to achieve analogous results. Moreover, still other embodiments implement the blocks as two or more interconnected hardware modules with related control and data signals communicated between and through the modules. Thus, the exemplary process flow applies to software, hardware, and firmware implementations.

At block 210, the exemplary method begins with receiving a file containing documents for addition to a database of an online information-retrieval system. In the exemplary embodiment, this entails landing skid 110 receiving an XML file containing two or more judicial, financial, news, or scientific documents. Execution continues at block 220.

Block 220 entails notifying two or more load servers that new documents are available for loading on the database. In the exemplary embodiment, this entails one of load monitor servers 124, specifically a designated active or primary one of the load monitor servers, polling landing skid 110 to determine or detect if new documents for one or more specific collections or databases have been added to the landing skid. If such documents have been added to the landing skid, the active load monitor server adds data regarding the file to load queue 128, and notifies two or more of load servers 122 in response to detecting reception of the file. Additionally, the active load monitor server writes or records a message to shared directory 129, with the message including a time stamp and a load server identifier for the active (primary) load monitor server. (At some point, at least one of the inactive (backup or secondary) load monitor servers will review the message and make a determination of whether the active load monitor is functioning properly.) Execution then advances to block 230.

Block 230 entails indexing the documents in the file using one of the notified load servers. In the exemplary embodiment, each of the load servers that is available and that has an SLA data structure that permits it to process the documents in the file, to access the load queue and attempt to process the documents in the file; however, only the first load server to respond to the notification gets to process the documents. In some embodiments, all non-busy load servers in the load domain respond initially to the notification and respectively assess the files compliance against their SLA data structures only after obtaining rights to process the new file. In other embodiments, the active load monitors are aware of the SLA data structures for each of the load servers and only communicate load-queue additions to those load servers that can process the corresponding documents. After one of the load servers has indexed the documents and generating corresponding index data, it notifies each of distribution servers 126 that distribution work is available by for example sending a message for these servers to check the queue. Additionally, in the exemplary embodiment, the selected load server automatically checks the load queue for any new load work.) Execution proceeds to block 240.

Block 240 entails loading the documents onto a user or subscriber accessible database. In the exemplary embodiment, this entails the load server selected at block 230 notifying two or more of the distribution servers that index data and corresponding files are available for distribution. In response, all non-busy distribution servers 128 attempt to gain rights to perform the distribution, that is, loading the documents and index data onto respective portions of the primary database. However, the first distribution server to respond to the notification is assigned the distribution work. The distribution work entails loading the documents and index data onto primary database 130 and secondary database 140, or more precisely respective portions of databases 130 and 140. In some embodiments, the work of mirroring documents from primary database 130 to secondary database 140 is performed by a separate server or software component other than the selected distribution server. For example, some embodiments use the Oracle Data Guard product. Exemplary execution continues at block 250.

In block 250, the selected one of distribution servers 126 notifies two or more load monitors 126 that the documents have been loaded on the database. In the exemplary embodiment, any inactive or secondary load monitors that receive the notification ignore the notification, whereas the active or primary load monitor proceeds as indicated for block 260. (Additionally, in the exemplary embodiment, the selected distribution server automatically checks the load queue for any new work.)

Block 260 entails confirming that the documents have been loaded on the database. In the exemplary embodiment, this confirmation entails the active or primary load monitor attempting to read an "end of file," "end of load," or other analogous indicator from secondary database 140. Successful reading of the indicator is regarded as confirmation that the loading process initiated at block 210 has completed, and the primary loading monitor writes a time-stamped message to the shared directory indicating successful completion of the loading task. (Some embodiments may read the primary database for an indication of whether the loading request has been fulfilled, rather than the secondary database; however, other embodiments may read both the primary and secondary databases for the "end of file" indicator. A failure to read the "end of file" indicator indicates a failure and this status is also communicated to the shared directory using a first one of the notified load monitors.

Block 270 entails determining whether the primary or active load monitor is operating properly using one of the secondary or inactive load monitors. In the exemplary embodiment, secondary load monitor reviews one or more messages in the shared directory to determine whether the primary load monitor is operating properly. Specifically, the secondary load monitor ensures that the primary load monitor is up and running (for example, every 60 seconds), ensures that the primary is finding all new files added (for example, every 5 minutes), and ensures that the primary is responding to end of load indicators or statuses. If any of these conditions are not met, the secondary load monitor takes over the primary load monitor status, possibly shuts down the failed monitor, begins processing of load requests, and issues a failed-event alert. A normal execution continues with return to block 210 for processing of further requests.

CONCLUSION

The embodiments described above and in the claims are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

The invention claimed is:

1. An information retrieval system comprising:
a queue for storing load data requests;
a set of two or more load servers for retrieving data from the queue and indexing documents for retrieval based on the data retrieved from the queue;
first and second load monitors for monitoring operation of the load servers and providing new data on the queue accessible by the set of loaders, with the first load monitor configured to provide information regarding its operations to the second load monitor, and the second load monitor configured to respond to status information indicating failure of the first load monitor to take over monitoring of the load servers and providing new data on the queue; and wherein each load server is associated with a service-level-agreement data structure, the service-level-agreement data structure including a first field for identifying for which databases the load server is permitted to index documents; a second field for indicating a minimal priority of document indexing requests that the load server is permitted to accept;
and a third field indicating a temporal aspect.

2. The system of claim 1, wherein to provide status information to the second load monitor, the first load monitor is configured to periodically write a time-stamped report to a predetermined portion of a network accessible storage device and the second load monitor is configured to read the time-stamped report on the network accessible storage device at predetermined intervals.

3. The system of claim 1, wherein the first load monitor is configured to notify each of the load servers when new data is added to the queue, and wherein any of the load servers that is not busy is configured to respond to the notification by attempting to retrieve the new data from the queue and to index the documents based on the new data.

4. The system of claim 1, further comprising a set of two or more distribution servers configured to respectively distribute index data generated by the load servers and corresponding documents to a primary index and a primary database for use by subscribers.

5. The system of claim 4:
wherein each load server is configured to provide a loader notification to each of the distribution servers to indicate that it has completed indexing a set of documents based on data retrieved from the queue; and
wherein any of the distribution servers that is not busy is configured to respond to the loader notification by attempting to distribute index data generated by the load server that provided the loader notification to the master index and to distribute documents corresponding to the loader notification to the database.

6. The system of claim 5, wherein each distribution server is configured to provide a distribution notification to each of the load monitors to indicate that it has completed distributing a set of documents based on data retrieved from the queue to the master index and to the database.

7. The system of claim 6, further comprising means, responsive to the distribution notification, for replicating the distributed index data and documents to a secondary index and database.

8. The system of claim 5, wherein each load server is configured to check the queue for new data after providing the loader notification.

9. The system of claim 7, wherein the first load monitor is configured to confirm replication of the distributed index data and documents in the secondary index and database and in response to confirming replication writing a time-stamped load completion message to a network accessible storage device; and wherein the second load monitor is configured to periodically determine whether the network accessible storage device includes messages confirming proper operation of the first load monitor.

10. A method comprising:
receiving a file containing documents for addition to a database of an online information-retrieval system;
notifying two or more load servers in response to receiving the file, wherein each load server is associated with a service-level-agreement data structure, the data structure including a first field for identifying for which databases the load server is permitted to index documents; a second field for indicating a minimal priority of document indexing requests that the load server is permitted to accept; and a third field indicating a temporal aspect;

indexing the documents in the file using one of the notified load servers;

loading the indexed documents onto the database;

notifying two or more load monitors that the documents have been loaded on the database;

confirming that the documents have been loaded on the database using a first one of the notified load monitors; and confirming proper operation of the first one of the notified load monitors using a second one of the notified load monitors.

11. The method of claim 10, wherein notifying two or more load servers, comprises:

detecting reception of the file;

adding data regarding the file to a load queue; and notifying the two or more load servers that new data has been added to the load queue.

12. The method of claim 10, wherein loading the indexed documents onto the database, comprises:

notifying two or more of distribution servers that index data and corresponding documents are available for loading; and using one of the two or more distribution servers to load the index data and corresponding documents on to the database.

13. The method of claim 10, wherein confirming that the documents have been loaded on the database includes reading an "end of file" or other analogous indicator from the database.

14. The method of claim 11, wherein confirming proper operation of a first one of the load monitors using a second one of the load monitors, comprises determining whether the first one of the load monitors has written one or more messages to a shared directory.

15. The method of claim 11, wherein indexing the documents in the file using one of the notified load servers, includes reviewing its associated service-level-agreement data structure to determine whether one or more of the notified load servers are authorized to process the documents.

* * * * *

UNITED STATES PATENT AND TRADEMARK OFFICE
CERTIFICATE OF CORRECTION

PATENT NO.         : 7,480,644 B2                                      Page 1 of 1
APPLICATION NO.    : 11/328499
DATED              : January 20, 2009
INVENTOR(S)        : Bluhm et al.

It is certified that error appears in the above-identified patent and that said Letters Patent is hereby corrected as shown below:

On the title page, item (54), in "Title", in column 1, line 1, after "SYSTEMS" insert -- , --.

On the title page, item (73), in "Assignee", in column 1, line 1, delete "Thomas" and insert -- Thomson --, therefor.

On page 2, under "Other Publications", in column 2, line 2, delete "Perliminary" and insert -- Preliminary --, therefor.

In column 1, line 1, after "SYSTEMS" insert -- , --.

Signed and Sealed this

Seventh Day of April, 2009

JOHN DOLL
*Acting Director of the United States Patent and Trademark Office*